United States Patent
Yamamoto et al.

(10) Patent No.: US 11,139,498 B2
(45) Date of Patent: Oct. 5, 2021

(54) ELECTRODE CATALYST FOR FUEL CELLS

(71) Applicants: Toru Yamamoto, Toyota (JP); Nobuaki Mizutani, Toyota (JP); Kohei Koyamada, Toyota (JP); Kotaro Horiai, Kakegawa (JP); Mikihiro Kataoka, Kakegawa (JP); Kenji Yamamoto, Kakegawa (JP)

(72) Inventors: Toru Yamamoto, Toyota (JP); Nobuaki Mizutani, Toyota (JP); Kohei Koyamada, Toyota (JP); Kotaro Horiai, Kakegawa (JP); Mikihiro Kataoka, Kakegawa (JP); Kenji Yamamoto, Kakegawa (JP)

(73) Assignees: TOYOTA JIDOSHA KABUSHIKI KAISHA, Toyota (JP); CATALER CORPORATION, Kakegawa (JP)

(*) Notice: Subject to any disclaimer, the term of this patent is extended or adjusted under 35 U.S.C. 154(b) by 216 days.

(21) Appl. No.: 16/014,941

(22) Filed: Jun. 21, 2018

(65) Prior Publication Data

US 2018/0375139 A1  Dec. 27, 2018

(30) Foreign Application Priority Data

Jun. 23, 2017 (JP) .............................. JP2017-122740

(51) Int. Cl.
*H01M 8/1004* (2016.01)
*H01M 4/92* (2006.01)
(Continued)

(52) U.S. Cl.
CPC ....... *H01M 8/1004* (2013.01); *H01M 4/8807* (2013.01); *H01M 4/9083* (2013.01);
(Continued)

(58) Field of Classification Search
CPC ......... H01M 4/926; H01M 2004/8684; H01M 2004/8689; H01M 2008/1095;
(Continued)

(56) References Cited

U.S. PATENT DOCUMENTS

| 6,444,347 | B1* | 9/2002 | Ouvry ................. | H01M 4/8605 |
|           |     |        |                     | 429/480     |
| 2005/0008562 | A1* | 1/2005 | Hyeon ................ | H01M 4/9083 |
|           |     |        |                     | 423/448     |

(Continued)

FOREIGN PATENT DOCUMENTS

| CN | 105814723 A | 7/2016 |
| EP | 3 053 648 A1 | 8/2016 |

(Continued)

OTHER PUBLICATIONS

Yang, Dongxing, et al. "Chemical analysis of graphene oxide films after heat and chemical treatments by X-ray photoelectron and Micro-Raman spectroscopy." Carbon 47.1 (2009): 145-152. (Year: 2009).*

(Continued)

*Primary Examiner* — Carlos Barcena
(74) *Attorney, Agent, or Firm* — Oliff PLC

(57) ABSTRACT

An electrode catalyst for fuel cells that can inhibit an increase in gas diffusion resistance includes a carbon material having a ratio of a peak intensity $I_A$ derived from an amorphous structure to a peak intensity $I_G$ derived from a graphite structure in an X-ray diffraction spectrum (ratio $I_A/I_G$) of 0.90 or less as a catalyst-supporting carrier.

20 Claims, 3 Drawing Sheets

(51) Int. Cl.
*H01M 4/88* (2006.01)
*H01M 4/90* (2006.01)
*H01M 8/1018* (2016.01)
*H01M 4/86* (2006.01)

(52) U.S. Cl.
CPC .......... *H01M 4/926* (2013.01); *H01M 4/8673* (2013.01); *H01M 2004/8684* (2013.01); *H01M 2004/8689* (2013.01); *H01M 2008/1095* (2013.01); *Y02E 60/50* (2013.01)

(58) Field of Classification Search
CPC ............. H01M 4/8673; H01M 4/8807; H01M 4/9083; H01M 8/1004; H01M 4/8663; Y02E 60/50
See application file for complete search history.

(56) References Cited

U.S. PATENT DOCUMENTS

| | | | |
|---|---|---|---|
| 2008/0165366 | A1 | 7/2008 | Schmitt |
| 2009/0169974 | A1 | 7/2009 | Tabata et al. |
| 2011/0200917 | A1* | 8/2011 | Takahashi ............... H01M 4/92 429/532 |
| 2012/0231338 | A1 | 9/2012 | Matsuzaka et al. |
| 2015/0295250 | A1 | 10/2015 | Nagami et al. |
| 2015/0352522 | A1 | 12/2015 | Mizuuchi et al. |
| 2016/0233520 | A1 | 8/2016 | Takahashi et al. |
| 2016/0329571 | A1 | 11/2016 | Matsumoto et al. |
| 2017/0104222 | A1 | 4/2017 | Ikehata et al. |
| 2017/0250432 | A1* | 8/2017 | Takahashi ............... H01M 4/86 |

FOREIGN PATENT DOCUMENTS

| | | |
|---|---|---|
| JP | 2011-115760 A | 6/2011 |
| JP | 2011-251285 A | 12/2011 |
| JP | 2013-190438 A | 9/2013 |
| JP | 2015-204216 A | 11/2015 |
| JP | 2017073357 A | 4/2017 |
| KR | 2015-0108868 A | 9/2015 |
| KR | 2016-0083909 A | 7/2016 |
| WO | 2007/116924 A1 | 10/2007 |
| WO | 2015/045852 A1 | 4/2015 |
| WO | 2015/088025 A1 | 6/2015 |
| WO | 2016063924 A1 | 4/2016 |

OTHER PUBLICATIONS

Park, Young-Chui, et al. "Effects of carbon supports on Pt distribution, ionomer coverage and cathode performance for polymer electrolyte fuel cells." Journal of Power Sources 315 (2016): 179-191. (Year: 2016).*
English translation of WO 2016/063924—Carbon Black for Fuel Cell (Year: 2016).*

* cited by examiner

ELECTRODE CATALYST FOR FUEL CELLS

CROSS REFERENCE TO RELATED APPLICATIONS

The present application claims priority from Japanese patent application JP 2017-122740 filed on Jun. 23, 2017, the content of which is hereby incorporated by reference into this application.

BACKGROUND

Technical Field

This disclosure relates to an electrode catalyst for fuel cells.

Background Art

Fuel cells generate electricity through an electrochemical reaction between hydrogen and oxygen. In principle, water is the only product generated as a result of fuel cell power generation. For such reason, fuel cells have been gaining attention as clean power generation systems that cause substantially no geoenvironmental burdens.

In a fuel cell, a fuel gas containing hydrogen is supplied to an anode (fuel electrode) and an oxidation gas containing oxygen is supplied to a cathode (air electrode), thereby generating electromotive force. Here, the oxidation reaction expressed by formula (1) below proceeds on the anode side while the reduction reaction expressed by formula (2) below proceeds on the cathode side. The entire reaction expressed by formula (3) below proceeds to supply electromotive force to an external circuit.

$$H_2 \rightarrow 2H^+ + 2e^- \tag{1}$$

$$(1/2)O_2 + 2H^+ + 2e^- \rightarrow H_2O \tag{2}$$

$$H_2 + (1/2)O_2 \rightarrow H_2O \tag{3}$$

As catalyst-supporting carriers used for electrode catalysts for fuel cells, carbon materials, which are conductive materials, are generally used.

For example, JP Patent Publication (Kokai) No. 2011-251285 A discloses a catalyst-supporting carrier obtained by carbonizing a raw material containing a nitrogen-containing organic substance and a metal. The publication also teaches that the catalyst-supporting carrier may contain 20 to 45% of a graphite-resembling structural component and 55 to 80% of an amorphous component. Furthermore, the publication teaches that the catalyst-supporting carrier may exhibit an intensity ratio $I_{1360}/I_{1580}$ of a 1360 cm$^{-1}$ band (D band) to a 1580 cm$^{-1}$ band (G band) in a Raman spectrum of 0.3 or more and 1.0 or less.

WO2007/116924 discloses a conductive carbon material for a fuel cell which has been graphitized at least in its surface layer, wherein the size (La) in the direction of a six-membered ring face (carbon plane) of a crystallite as measured by X-ray diffractometry is 4.5 nm or more.

JP Patent Publication (Kokai) No. 2015-204216 A discloses an electrode catalyst for fuel cells including a carbon carrier and a catalyst metal selected from platinum and a platinum allow supported in the carbon carrier, wherein the carbon carrier has 5.0 nm or more of a crystallite size (Lc) of the (002) plane of carbon and a specific area within a range of 95 to 170 m$^2$/g, and the catalyst metal has 4.5 nm or less of the crystallite diameter of the (220) plane of platinum.

SUMMARY

When fuel cells are operated, there is a problem of degradation of the electrode catalyst leading to an increase in gas diffusion resistance. In conventional art as in the publications described above, carbon materials identified based on a value of La, Lc, a peak ratio in a Raman spectrum, or the like are used, but conventional fuel cells have not fully solved the problem concerning an increase in gas diffusion resistance of electrode catalysts associated with operation.

Therefore, this disclosure relates to providing an electrode catalyst for fuel cells that can inhibit an increase in gas diffusion resistance.

For example, use of a carbon material having a ratio of a peak intensity $I_A$ derived from an amorphous structure to a peak intensity $I_G$ derived from a graphite structure in an X-ray diffraction spectrum (ratio $I_A/I_G$) of 0.90 or less as a catalyst-supporting carrier can inhibit an increase in gas diffusion resistance associated with use of a fuel cell. Based on the findings, exemplary embodiments are shown below.

For example, exemplary embodiments are as follows.

(1) An electrode catalyst for fuel cells comprising a carbon material having a ratio of a peak intensity $I_A$ derived from an amorphous structure to a peak intensity $I_G$ derived from a graphite structure in an X-ray diffraction spectrum (ratio $I_A/I_G$) of 0.90 or less as a catalyst-supporting carrier.

(2) The electrode catalyst for fuel cells according to (1), wherein the peak intensity ratio $I_A/I_G$ of the carbon material is 0.80 or less.

(3) The electrode catalyst for fuel cells according to (1) or (2), wherein the carbon material has a ratio of a D-band peak intensity to a G-band peak intensity in a Raman spectrum, D/G, of 1.50 or more.

(4) The electrode catalyst for fuel cells according to any one of (1) to (3), comprising a catalyst metal supported by the carbon material.

(5) The electrode catalyst for fuel cells according to (4), wherein the catalyst metal comprises platinum or a platinum alloy.

(6) A catalyst layer for fuel cells, comprising the electrode catalyst for fuel cells according to any one of (1) to (5).

(7) The catalyst layer for fuel cells according to (6) further comprising an ionomer.

(8) A fuel cell comprising the electrode catalyst for fuel cells according to any one of (1) to (5) or the catalyst layer for fuel cells according to (6) or (7).

According to exemplary embodiments, it is possible to provide an electrode catalyst for fuel cells that can inhibit an increase in gas diffusion resistance.

DETAILED DESCRIPTION

Figure 1:
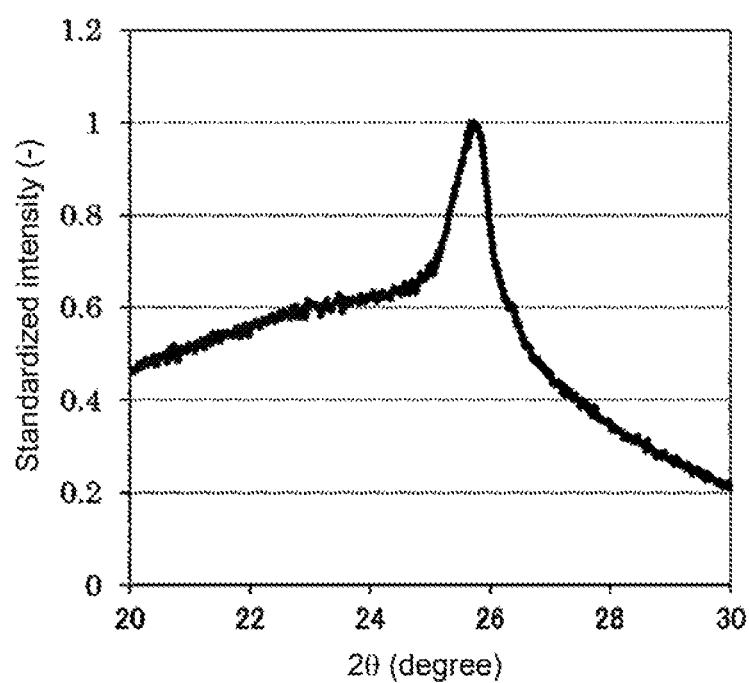
FIG. 1 is an X-ray diffraction spectrum of a carbon material E1 used in Examples.
Figure 2:
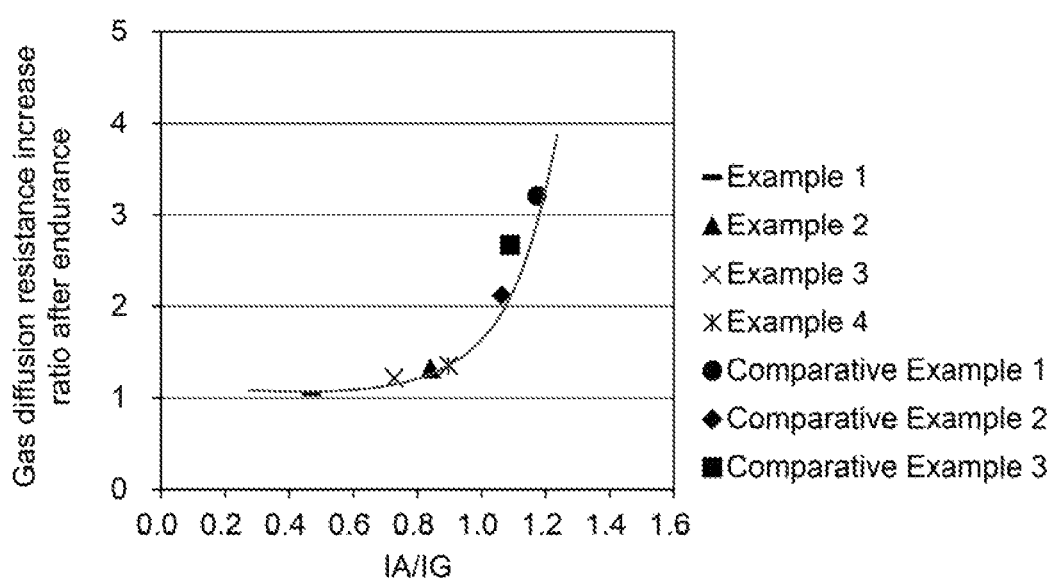
FIG. 2 is a plot of an increase ratio of gas diffusion resistance of membrane electrode assemblies prepared in Examples and Comparative Examples.

A preferred embodiment is described in detail below.

<1. Electrode Catalyst for Fuel Cells>

The exemplary embodiment is an electrode catalyst for fuel cells comprising a carbon material having a predetermined peak intensity ratio $I_A/I_G$ as a catalyst-supporting carrier.

In an X-ray diffraction spectrum of the carbon material used in the electrode catalyst for fuel cells according to the exemplary embodiment, a ratio of a peak intensity $I_A$ derived from an amorphous structure to a peak intensity $I_G$ derived from a graphite structure (ratio $I_A/I_G$) is 0.90 or less. Use of a carbon material having a peak intensity ratio $I_A/I_G$ of 0.90 or less as a catalyst-supporting carrier can provide an electrode catalyst for fuel cells that can inhibit an increase in gas diffusion resistance. In the X-ray diffraction spectrum, a peak derived from a graphite structure appears at a diffraction angle of around 26°. In the X-ray diffraction spectrum, a peak derived from an amorphous structure appears broadly over diffraction angles 15° to 35°. That is, if X-ray diffraction (e.g., CuKα is used as an incident X ray) is conducted on the carbon material constituting the carrier to provide an X-ray diffraction spectrum (e.g., FIG. 1), the peak at a diffraction angle (2θ) of around 26° (e.g., 15° to 35°) in the X-ray diffraction spectrum can be separated into a peak derived from the graphite structure of the carbon material and a relatively broad peak derived from the amorphous structure. The peak intensity ratio $I_A/I_G$ means a ratio of the separated peak intensity $I_A$ derived from the amorphous structure to the separated peak intensity $I_G$ derived from the graphite structure. A lower peak intensity ratio $I_A/I_G$ tends to increase the crystallinity of the carbon material. The peak intensity ratio $I_A/I_G$ is preferably 0.80 or less, more preferably 0.70 or less, still more preferably 0.60 or less, particularly preferably 0.50 or less. When the peak intensity ratio $I_A/I_G$ is within this range, a reduction in the thickness of the catalyst layer associated with operation can be effectively inhibited.

In the exemplary embodiment, a ratio of a D-band peak intensity to a G-band peak intensity in a Raman spectrum of the carbon material (ratio D/G) is preferably 1.50 or more. The D-band peak means a peak observed in a region of 1300 to 1400 $cm^{-1}$, usually having a maximal absorption wavelength of 1360 $cm^{-1}$. The G-band peak means a peak observed in a region of 1500 to 1600 $cm^{-1}$, usually having a maximal absorption wavelength of 1580 $cm^{-1}$. It is known that the D-band peak is derived from a non-graphite structure and the G-band peak is derived from a graphite structure in the Raman spectrum. For this reason, as the peak intensity ratio D/G increases, the crystalline structure of the carbon material is more disturbed. The peak intensity ratio D/G is preferably 1.54 to 1.90, more preferably 1.60 to 1.68.

The crystallite thickness Lc of the (002) plane of the carbon material is, for example, 1.0 to 3.0 nm, preferably 1.2 to 2.8 nm. When Lc of the carbon material is within the range, it is possible to obtain an electrode catalyst that is highly oxidation-resistant and/or has a large amount of a catalyst metal supported. Lc can be determined by the following method, for example. XRD of the carbon material contained in the electrode catalyst for fuel cells is measured using an XRD device. Based on the obtained XRD spectrum, Lc of the (002) plane of carbon is determined using the Scherrer equation.

The crystal width La of the carbon material is, for example, 1.8 to 3.2 nm, preferably 2.0 to 3.1 nm, more preferably 2.2 to 3.0 nm. When La of the carbon material is within the range, it is possible to have high oxidation resistance and/or enhance gas diffusibility. La can be determined based on the obtained XRD spectrum using the Scherrer equation, in the same manner as Lc.

The specific surface area of the carbon material is, for example, 400 to 1400 $m^2/g$, preferably 800 to 1200 $m^2/g$. A specific surface area of the carbon material of 400 $m^2/g$ or more is preferred because it is possible to produce an electrode catalyst having a large amount of a catalyst metal supported. A specific surface area of the carbon material of 1400 $m^2/g$ or less is preferred because gas diffusibility increases. The specific surface area of the carbon material can be measured using a specific surface area measuring apparatus, for example, based on a gas adsorption method.

The average particle size of the carbon material is not particularly limited, and is for example, 0.05 to 10 μm. Note that the average particle size refers to the particle diameter corresponding to the 50% accumulated particle size from the fine particle side (also referred to as the D50 particle size or median size) in the particle size distribution based on volume obtained by particle size distribution measurement on the basis of a laser diffraction and light scattering method.

The catalyst metal contained in the electrode catalyst for fuel cells is not particularly limited, and examples thereof include platinum and platinum alloys. The platinum alloy usually consists of Pt and one or more further metals. In such cases, examples of the one or more further metals that form a platinum alloy include cobalt (Co), gold (Au), palladium (Pd), nickel (Ni), manganese (Mn), iridium (Ir), iron (Fe), copper (Cu), titanium (Ti), tantalum (Ta), niobium (Nb), yttrium (Y), and lanthanoid elements such as gadolinium (Gd), lanthanum (La), and cerium (Ce). The one or more further metals are preferably Co, Au, Pd, Ni, Mn, Cu, Ti, Ta, or Nb and more preferably Co. For example, the platinum alloy is $Pt_3Co$.

The content of the catalyst metal in the electrode catalyst for fuel cells is preferably 10 to 60 parts by mass, more preferably 20 to 45 parts by mass, still more preferably 30 to 40 parts by mass based on 100 parts by mass of the carbon material.

The composition and content (amount supported) of the catalyst metal can be determined by, for example, dissolving the catalyst metal from the electrode catalyst using aqua regia, followed by quantitative determination of the catalyst metal ions in the solution using an inductively coupled plasma (ICP) emission spectrometer.

The electrode catalyst for fuel cells of the exemplary embodiment can be applied to both fuel cell cathode and anode. Therefore, the exemplary embodiment also relates to a fuel cell comprising the electrode catalyst for fuel cells according to the exemplary embodiment. The fuel cell of the exemplary embodiment has a small increase in the gas diffusion resistance and thus can be used for a long period. The fuel cell of the exemplary embodiment can be applied to applications such as automobiles.

As described above, the carbon material used in the exemplary embodiment has a predetermined peak intensity ratio $I_A/I_G$. In a preferred embodiment, in addition to the predetermined peak intensity ratio $I_A/I_G$, the carbon material has also a predetermined peak intensity ratio D/G. Such carbon material can be selected by actually measuring its peak intensity ratio $I_A/I_G$ (peak intensity ratio D/G, depending on the case) and determining if the peak intensity ratio is included in the predetermined range. Therefore, another aspect of exemplary embodiments relates to a method for selecting a carbon material used in an electrode catalyst for fuel cells. That is, one aspect of the exemplary embodiments is a selection method for judging a carbon material as a non-defective product (accepted product) when the peak intensity ratio $I_A/I_G$ of the carbon material is 0.90 or less. Also, one preferred aspect of the exemplary embodiments is a selection method for judging a carbon material as a non-defective product (accepted product) when the peak intensity ratio $I_A/I_G$ of the carbon material is 0.90 or less and the peak intensity ratio D/G thereof is 1.50 or more. Thus, the exemplary embodiment relates to a method for selecting a carbon material used as a catalyst-supporting carrier of an electrode catalyst for fuel cell, comprising a step of calculating a ratio of a peak intensity $I_A$ derived from an amorphous structure to a peak intensity $I_G$ derived from a graphite structure in an X-ray diffraction spectrum of the carbon material (ratio $I_A/I_G$), and a step of determining the carbon material as a non-defective product when the ratio $I_A/I_G$ is 0.90 or less. The method of the exemplary embodiment further comprises a step of calculating a ratio of a D-band peak intensity D to a G-band peak intensity G in a Raman spectrum of the carbon material (ratio D/G), wherein the determination step is a step of judging the carbon material as a non-defective product when the ratio $I_A/I_G$ is 0.90 or less and the ratio D/G is 1.50 or more.

A method for producing the carbon material in the exemplary embodiment, that is, the carbon material having a predetermined peak intensity ratio $I_A/I_G$ (and the predetermined peak intensity ratio D/G, depending on the case) will be described below. The carbon material can be produced mainly through a carbonization step, an activation step, and a heat treatment step.

The carbonization step (graphitization treatment step) can be carried out by heat treating a raw material such as raw material charcoal under an inert atmosphere, for example, at a temperature of 1000° C. to 2500° C. for 1 to 24 hours. Thereafter, the activation step is carried out by heat treating the carbonized raw material charcoal in a predetermined amount of air. The obtained carbon material may be subjected to a washing step and/or a crushing step as required.

The peak intensity ratio $I_A/I_G$ (and the peak intensity ratio D/G) of the carbon material can be adjusted by the conditions of the carbonization step, activation step, and heat treatment step. That is, in the exemplary embodiment, the conditions of the carbonization step, activation step, and heat treatment step can be adjusted such that a carbon material to be obtained has a predetermined peak intensity ratio.

For example, when the heating temperature in the carbonization step is increased, a graphite structure becomes likely to be formed. Thus, a carbon material to be obtained tends to have a lower peak intensity ratio $I_A/I_G$ (and a peak intensity ratio D/G). In contrast, when the heating temperature in the carbonization step is reduced, an amorphous structure becomes likely to be formed. Thus, the carbon material to be obtained tends to have a higher peak intensity ratio $I_A/I_G$ (and a peak intensity ratio D/G). In this respect, the heating temperature in the carbonization step is preferably 1200 to 2200° C., more preferably 1400 to 1800° C. Also when the heating time in the carbonization step is extended, a graphite structure becomes likely to be formed. In this respect, the heating time in the carbonization step is preferably 5 to 10 hours, more preferably 6 to 8 hours.

The activation step is preferably carried out in the presence of an oxygen-containing gas, more preferably in the presence of air. In the heat treatment step, for example, a reaction between carbon and water vapor, a reaction between carbon and oxygen, a reaction between carbon dioxide generated from a combustion reaction and carbon, or the like occurs. The peak intensity ratio $I_A/I_G$ (and peak intensity ratio D/G) of the carbon material to be obtained may vary also by this heat treatment, as by the above carbonization step, depending on the conditions such as the heating temperature and heating time. Thus, the conditions are desirably adjusted as appropriate. The heat treatment temperature is preferably 200 to 800° C., more preferably in the range of 300 to 600° C. The heat treatment time is preferably in the range of 1 to 5 hours, more preferably in the range of 2 to 3 hours.

Examples of the raw material of the carbon material include, but not particularly limited to, coal coke, petroleum pitch, petroleum coke, and hydrocarbon gases such as acetylene. In order to reduce metal impurities and uncarbonized products such as tar, hydrocarbon gases such as acetylene are preferred.

In the activation step, water vapor can be used instead of the presence of air.

Additionally, the carbon material may be crushed as required (crushing step). The washing step and crushing step can be carried out by methods usually employed in the art.

The carbon material having a predetermined intensity ratio also can be obtained by, for example, subjecting a commercially-available carbon carrier to graphitization treatment (heat treatment) and/or activation treatment (air activation).

In the exemplary embodiment, the obtained carbon material can be evaluated by measuring its peak intensity ratio. In the evaluation, the peak intensity ratio $I_A/I_G$ (and the peak intensity ratio D/G) of the obtained carbon material is determined followed by determining if the ratio is included in the predetermined range. That is, when the peak intensity ratio $I_A/I_G$ is 0.90 or less, the obtained carbon material is judged as a non-defective product (accepted product). In a preferred embodiment, when the peak intensity ratio $I_A/I_G$ is 0.90 or less and the peak intensity ratio D/G is 1.50 or more, the obtained carbon material is judged as a non-defective product (accepted product). Then, a carbon material determined as an "accepted product" based on the evaluation is selected and used as a catalyst-supporting carrier for an electrode catalyst for fuel cells. This may prevent a "rejected product" from proceeding to the following steps, and thus, it is possible to stably provide a carbon material having higher quality and more excellent reliability.

A carbon material can be suitably produced by the steps described above.

<2. Method for Producing Electrode Catalyst for Fuel Cells>

The electrode catalyst for fuel cells according to the exemplary embodiment can be produced by allowing a carbon material to support a catalyst metal. This step will be described more specifically below.

First, the above carbon material is allowed to react with a catalyst metal material containing a catalyst metal (e.g., platinum) to allow the carbon material to support the catalyst metal material (catalyst metal salt supporting step).

The salt of the catalyst metal contained in the catalyst metal material used in this step is preferably hexahydroxoplatinum nitrate, dinitrodiammineplatinum(II) nitrate, or a hexahydroxoplatinum ammine complex, if the catalyst metal is platinum, for example. If the catalyst metal is a platinum alloy, the catalyst metal material used in this step preferably contains a further metal salt forming a platinum alloy. In this case, the further metal salt forming the platinum alloy is preferably a salt comprising the further metal and nitric acid or acetic acid, and more preferably cobalt nitrate, nickel nitrate, manganese nitrate, cobalt acetate, nickel acetate, or manganese acetate.

This step can be carried out by using a reaction involving the colloid method, the precipitation/sedimentation method, or a similar method, all of which are generally used in the art.

Subsequently, a catalyst metal (e.g., platinum) in the metal form is formed by reducing the catalyst metal salt contained in the catalyst metal material supported by the carbon material obtained by the catalyst metal salt supporting step (catalyst particle formation step).

In this step, the carbon material supporting a catalyst metal material is heat-treated so as to reduce the catalyst metal salt contained in the catalyst metal material supported by the carbon material. This allows catalyst particles containing the catalyst metal in the metal form to be formed. The heat treatment temperature is usually 100° C. or less, for example, in the range of 40 to 90° C. It is preferable to carry out the heat treatment in the presence of a reducing agent such as ethanol, hydrazine, methanol, propanol, sodium borohydride, or isopropyl alcohol. It is possible to form catalyst particles containing a catalyst metal by heat-treating the carbon material supporting a catalyst metal material under the above conditions so as to reduce the catalyst metal salt.

Alternatively, after the catalyst particle formation step, a step of calcining an electrode catalyst containing catalyst particles formed by the heat treatment (calcination step) may be further carried out. In the calcination step, the temperature for calcining the electrode catalyst containing catalyst particles is, for example, 1000° C. or less, preferably in the range of 600 to 1000° C., more preferably in the range of 700 to 900° C. This calcination step is preferably carried out in the presence of an inert gas (e.g., nitrogen gas). The calcination time is preferably in the range of 1 to 6 hours, more preferably in the range of 1 to 3 hours. The inert gas is preferably argon, nitrogen, or helium, more preferably argon. For example, when the catalyst metal material contains a further metal salt forming a platinum alloy, it is possible to alloy platinum and a further metal from a further metal salt by carrying out the calcination step to form a platinum alloy in the metal form.

<3. Method for Producing Electrode for Fuel Cells>

The catalyst layer for fuel cells of the exemplary embodiment preferably contains an ionomer, in addition to the electrode catalyst for fuel cells according to the exemplary embodiment containing a carbon material as a catalyst-supporting carrier and a catalyst metal. In the catalyst layer for fuel cells in the exemplary embodiment, the carbon material supporting a catalyst metal is preferably coated with an ionomer. In this case, the ionomer also serves as an adhesive for bonding a plurality of catalysts to one another. According to the catalyst layer for fuel cells of the exemplary embodiment, it is possible to effectively inhibit an increase in the gas diffusion resistance associated with use.

The ionomer is not particularly limited, and, for example, those usually used in the art can be used. An example of the ionomer can include Nafion (DE2020; manufactured by Du Pont). Ionomers generally used in the art usually have a hydrophobic strong cation exchange group in which a strong acidic group (e.g., sulfonic acid group) is bonded to a perhalogenated (e.g., fluorinated) hydrocarbon chain. The ionomer may be adsorbed onto the surface of a carbon material via hydrophobic interaction by such a hydrophobic group.

As a specific example, the cathode catalyst layer of the exemplary embodiment comprises a particulate carbon material, catalyst particles (e.g., platinum) supported by the carbon material, and an ionomer with which the carbon material and the catalyst particles are coated. Protons generated on an anode side pass through an electrolyte membrane to reach a cathode catalyst layer. The protons that have reached the cathode catalyst layer reach the catalyst particles in the cathode catalyst layer, via the ionomer in cathode catalyst layer. Oxygen in oxidized gas supplied to the cathode catalyst layer from a cathode gas diffusion layer passes through voids in the cathode catalyst layer to diffuse across the cathode catalyst layer, reaching the catalyst particles. Electrons generated on the anode side pass through an external circuit to reach the cathode catalyst layer, and, reach the catalyst particles through the carbon material in the cathode catalyst layer. The protons, electrons, and oxygen that have reached the catalyst particles react to each other to generate water.

The content of the ionomer is, for example, 80 to 200 parts by mass based on 100 parts by mass of the carbon material.

The above electrode catalyst for fuel cells and ionomer are dispersed in a solvent (for example, water or ethanol) so as to prepare a catalyst slurry.

Subsequently, the catalyst slurry is applied onto, for example, a polytetrafluoroethylene (PTFE) sheet or Teflon sheet and dried at 50° C. to 150° C. for two minutes or more to prepare a catalyst layer.

The catalyst layer of the exemplary embodiment can be used either as a catalyst layer used on the cathode side (cathode side catalyst layer) of the fuel cell and as a catalyst layer used on the anode side (anode side catalyst layer), depending on applications.

<4. Method for Producing Membrane Electrode Assembly and Fuel Cell>

Figure 3:
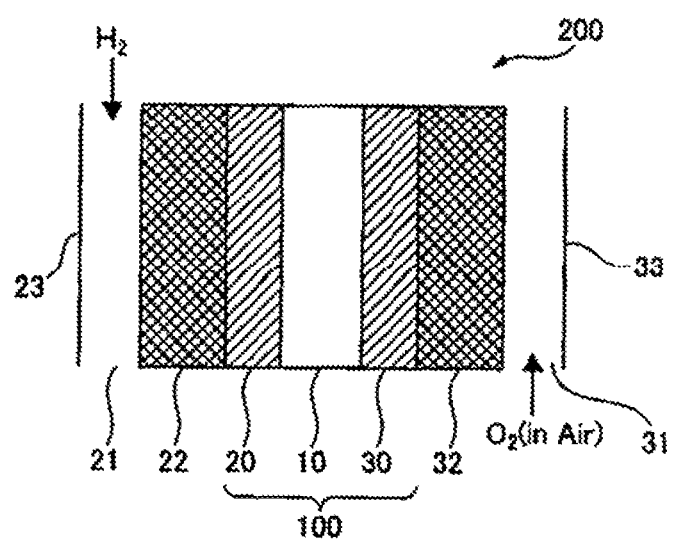
FIG. 3 schematically shows a cross section for describing an exemplary structure of a membrane electrode assembly in an embodiment.

FIG. 3 shows a membrane electrode assembly 100 that includes an anode (catalyst layer) 20 and a cathode (catalyst layer) 30 each including an electrode for fuel cells on either face of an electrolyte membrane 10 having proton conductivity. FIG. 3 also shows a fuel cell 200 comprising this membrane electrode assembly 100, an anode side gas flow path 21, an anode side gas diffusion layer 22, an anode side separator 23, a cathode side flow path 31, a cathode side gas diffusion layer 32, and a cathode side separator 33 as a single cell.

The electrolyte membrane 10 is a proton exchange membrane that serves to conduct protons from the anode 20 to the cathode 30. The electrolyte membrane 10 is constituted by, for example, a hydrocarbon-based or fluorine-based polymer electrolyte having an acid functional group such as a phosphoric acid group, sulfonic acid group, or phosphonic acid group in its side chain. Specific examples of the electrolyte membrane 10 include NAFION (Du Pont, trademark), FLEMION (ASAHI GLASS CO., LTD., trademark), and ACIPLEX (Asahi Kasei Chemicals Corporation, trademark).

The anode 20 and the cathode 30 are layers that serve as electrodes in the fuel cell 200.

The gas diffusion layers 22 and 32 are constituted by, for example, porous carbon having a myriad of pores that enable reaction gas and water to pass therethrough in the direction of the thickness of the layers. The gas diffusion layers 22 and 32 have a function of homogeneously diffusing reaction gas in the anode 20 and the cathode 30 as well as of inhibiting drying of the membrane electrode assembly 100. As the gas diffusion layers 22 and 32, carbon porous bodies such as carbon paper, carbon cloth, and carbon felt, carbonized polyimide, a mixture of carbon black and fluorine resin, carbon non-woven fabric coated with fluorine and the like can be used, for example.

The separators 23 and 33 are constituted by an electron conductive material. Examples of such materials that can be used for the separators 23 and 33 include carbon, resin molded carbon, titanium, and stainless steel. On the gas diffusion layer 22 side surface of the anode side separator 23, the anode side gas flow path 21 for allowing hydrogen and the like as a fuel gas to pass therethrough is formed. Likewise, on the gas diffusion layer 32 side surface of the cathode side separator 33, the cathode side gas flow path 31 for allowing air as an oxidant gas (oxygen) and the like to pass therethrough is formed.

EXAMPLES

Exemplary embodiments are more specifically described below with reference to the Examples. However, the scope of the exemplary embodiments is not limited to the Examples.

[Preparation of Carbon Material]

Raw materials 1 to 4 listed below were subjected to graphitization treatment and/or air activation treatment to produce carbon materials E1 to E4 to be used in the Examples. Specifically, the raw materials 1 and 3 were subjected to graphitization treatment and air activation treatment to produce the carbon materials E1 and E3, and the raw materials 2 and 4 were subjected to air activation treatment to produce the carbon materials E2 and E4.

Raw materials 5 and 6 listed below were respectively used as carbon materials C1 and C2 to be used in Comparative Examples. A raw materials 7 listed below was subjected to air activation treatment to produce the carbon material C3 to be used in Comparative Examples.

Raw material 1: CNovel® (manufactured by Toyo Tanso Co., Ltd., porous carbon material)
Raw material 2: DENKA BLACK® (manufactured by Denka Company Limited)
Raw material 3: DENKA BLACK Li (manufactured by Denka Company Limited)
Raw material 4: DENKA BLACK Li (manufactured by Denka Company Limited)
Raw material 5: VULCAN® XC72 (manufactured by Cabot Corporation)
Raw material 6: Ketjenblack EC600JD (manufactured by Lion Corporation)
Raw material 7: Ketjenblack EC600JD (manufactured by Lion Corporation)

[Measurement of Peak Intensity Ratio $I_A/I_G$]

The carbon materials E1 to E4 and carbon materials C1 to C3 were measured by an X-ray diffraction method and peak intensity ratios $I_A/I_G$ were calculated. In the measurement by the X-ray diffraction method, an X-ray diffraction instrument, model "Ultima IV" manufactured by Rigaku Corporation and a CuKα ray were used to measure X-ray diffraction intensities under the following conditions.

Tube voltage; 40 kV, tube current; 250 mA
Divergence slit; 1 deg, scattering slit; 1 deg, receiving slit; 3 deg
Data reading interval; 0.04°, count time; 1 sec, measurement angle; 8 to 65°

As a typical example, the X-ray diffraction spectrum of the carbon material E1 is shown in FIG. 1.

With respect to the obtained X-ray diffraction spectrum, an amorphous structure-derived peak having a relatively broad peak shape and a graphite structure-derived peak having a relatively sharp peak shape were separated, and the peak top values were each taken as a peak intensity $I_A$ and a peak intensity $I_G$. The peaks were separated using analysis software attached to the X-ray diffraction instrument. In the peak separation, in order to evaluate the structure, a peak around 2θ=15° to 35° was separated into two components of an amorphous structure-derived peak and a graphite structure-derived peak (2θ=about 26°).

The peak intensities of the separated peaks were each determined, and a peak intensity ratio $I_A/I_G$ was calculated (Table 1).

[Measurement of Peak Intensity Ratio D/G]

The carbon materials E1 to E4 and carbon materials C1 to C3 were measured by Raman spectroscopy and peak intensity ratios D/G were calculated. Raman spectroscopy measurement was carried out by using a Raman spectrometer (NRS-1000; manufactured by JASCO Corporation). Measurement conditions were as follows: laser wavelength: 532 nm, laser output: 100 mV. In the obtained Raman spectrum, a peak observed in the region of 1300 to 1400 $cm^{-1}$ (D-band peak) and a peak observed in the region of 1500 to 1600 $cm^{-1}$ (G-band peak) were identified. From the identified D-band peak and G-band peak, the intensity ratio D/G of the peak intensity D of the D-band peak to the peak intensity G of the G-band peak was calculated.

[Crystallite Thickness (Lc) and Crystallite Width (La) of Carbon Material]

The crystallite thickness (Lc) and crystallite width (La) of a carbon material were measured using an X-ray diffraction instrument, and the crystallite thickness (Lc) and crystallite width (La) of the carbon material were calculated according to the Scherrer equation.

Example 1

<Preparation of Electrode Catalyst>

The carbon material E1 (D/G=1.60, La=2.4, Lc=2.2) (0.7 g) was suspended in 900 g of pure water. A dinitrodiammineplatinum(II) nitrate solution containing Pt in an amount of Pt supplied (0.3 g), which corresponds to an amount of Pt supported of 30% by mass based on the total mass of the final product, and 100 g of 99.5% ethanol were added to this suspension liquid in the order mentioned. This mixture was sufficiently stirred to be homogeneous followed by heating at 60 to 95° C. for three hours. After heating, the mixture was filtered, and the obtained powder was dried at 80° C. for 10 hours. The dried powder was calcined in nitrogen gas at 800° C. for an hour to obtain an electrode catalyst E1.

<Preparation of Catalyst Slurry>

The electrode catalyst E1 (1 g) was suspended in pure water. A Nafion® DE2020 solution (manufactured by Du Pont) as an ionomer and ethanol were added to this suspension liquid. The obtained suspension liquid was stirred overnight and then subjected to dispersion treatment using an ultrasonic homogenizer to prepare a catalyst slurry. Components in the catalyst slurry were each added so as to achieve a weight ratio of the ionomer (solid content)/carbon material of 0.80.

<Formation of Catalyst Layer>

The obtained catalyst slurry was homogeneously applied using a squeezee on a Teflon sheet so as to achieve a weight of Pt in the catalyst per unit area of 0.3 mg/$cm^2$ followed by drying to form a catalyst layer.

<Preparation of Membrane Electrode Assembly>

The obtained catalyst layer was used as a cathode, and a solid polymer electrolyte membrane sandwiched between an anode and the cathode was hot-pressed (140° C., 300 seconds) to prepare a membrane electrode assembly E1 (electrode area: 1 cm²). As the anode, a catalyst layer containing Ketjenblack® supporting 30% of Pt as an electrode catalyst was used. As the solid polymer electrolyte membrane, Nafion NRE-212 (manufactured by Du Pont) was used. The amount of Pt coating for the anode was set to 0.05 mg/cm².

Example 2

An electrode catalyst E2 was prepared in the same manner as in Example 1, except that the carbon material E2 (D/G=1.70, La=2.5, Lc=1.8) was used instead of the carbon material E1. Additionally, a membrane electrode assembly E2 was prepared in the same manner as in Example 1, except that the electrode catalyst E2 was used instead of the electrode catalyst E1.

Example 3

An electrode catalyst E3 was prepared in the same manner as in Example 1, except that the carbon material E3 (D/G=1.90, La=2.8, Lc=2.6) was used instead of the carbon material E1. Additionally, a membrane electrode assembly E3 was prepared in the same manner as in Example 1, except that the electrode catalyst E3 was used instead of the electrode catalyst E1.

Example 4

An electrode catalyst E4 was prepared in the same manner as in Example 1, except that the carbon material E4 (D/G=1.80, La=2.7, Lc=2.5) was used instead of the carbon material E1. Additionally, a membrane electrode assembly E4 was prepared in the same manner as in Example 1, except that the electrode catalyst E4 was used instead of the electrode catalyst E1.

Comparative Example 1

An electrode catalyst C1 was prepared in the same manner as in Example 1, except that the carbon material C1 (La=3.1, Lc=0.78) was used instead of the carbon material E1. Additionally, a membrane electrode assembly C1 was prepared in the same manner as in Example 1, except that the electrode catalyst C1 was used instead of the electrode catalyst E1.

Comparative Example 2

An electrode catalyst C2 was prepared in the same manner as in Example 1, except that the carbon material C2 (La=2.6, Lc=2.4) was used instead of the carbon material E1. Additionally, a membrane electrode assembly C2 was prepared in the same manner as in Example 1, except that the electrode catalyst C2 was used instead of the electrode catalyst E1.

Comparative Example 3

An electrode catalyst C3 was prepared in the same manner as in Example 1, except that the carbon material C3 was used instead of the carbon material E1. Additionally, a membrane electrode assembly C3 was prepared in the same manner as in Example 1, except that the electrode catalyst C3 was used instead of the electrode catalyst E1.

[Evaluation 1]
<Gas Diffusion Resistance>

The prepared membrane electrode assemblies E1 to E4 and C1 to C3 were used to carry out I-V evaluation under conditions including a low oxygen concentration (2% $O_2$) environment, a low temperature (40° C.), and an anode (hydrogen) dew point of 55° C., and a cathode (air) dew point of 55° C. The obtained limiting current value $I_{min}$ [A/m²] and oxygen partial pressure $P_{O_2}$ [KpA-abs] were used to calculate gas diffusion resistance (s/m) according to the following expression with Faraday constant F=96,485 [C/mol], gas constant R 8.314 [J/molK], and cell temperature T [K] (gas diffusion resistance before endurance test).

Gas diffusion resistance [s/m]=4 $F \times P_{O_2} \times 1000 R/T/$ ($I_{min} \times 10000$)

As the endurance test, a hold operation was carried out at 1.3 V for two hours under conditions including a flow rate of $H_2/N_2$=0.5/1.0 L/min, a cell temperature of 80° C., an anode (hydrogen) dew point of 80° C., a cathode (air) dew point of 80° C., and a back pressure of 100 kPa-abs.

Thereafter, the gas diffusion resistance after the endurance test (gas diffusion resistance after endurance test) was measured, and the increase ratio of the gas diffusion resistance was calculated by the following expression.

Increase ratio of gas diffusion resistance (%)=Gas diffusion resistance after endurance test/Gas diffusion resistance before endurance test×100

The results are shown in Table 1.

TABLE 1

| Name | Carbon material | $I_A/I_G$ | Gas diffusion resistance before endurance (s/m) | Gas diffusion resistance after endurance (s/m) | Gas diffusion resistance increase ratio (%) |
|---|---|---|---|---|---|
| Example 1 | E1 | 0.47 | 196.6 | 206.5 | 1.05 |
| Example 2 | E2 | 0.84 | 90.0 | 118.8 | 1.32 |
| Example 3 | E3 | 0.73 | 150.3 | 183.4 | 1.22 |
| Example 4 | E4 | 0.90 | 126.7 | 171.4 | 1.35 |
| Comparative Example 1 | C1 | 1.17 | 116.2 | 373.0 | 3.21 |
| Comparative Example 2 | C2 | 1.06 | 150.2 | 318.5 | 2.12 |
| Comparative Example 3 | C3 | 1.09 | 120.0 | 320.4 | 2.67 |

[Evaluation 2]
<Catalyst Layer Thickness after Endurance Test>

When the thickness of the cathode catalyst layer of the membrane electrode assembly E2 before and after the aforementioned endurance test was measured, the reduction ratio was 35%.

DESCRIPTION OF SYMBOLS

10: electrolyte membrane
20: anode (catalyst layer)
21: anode side gas flow path
22: anode side gas diffusion layer
23: anode side separator
30: cathode (catalyst layer)
31: cathode side flow path
32: cathode side gas diffusion layer
33: cathode side separator
100: membrane electrode assembly
200: fuel cell

What is claimed is:

1. An electrode catalyst for fuel cells, comprising:
   a carbon material having:
      a ratio of a peak intensity $I_A$ derived from an amorphous structure to a peak intensity $I_G$ derived from a graphite structure in an X-ray diffraction spectrum (ratio $I_A/I_G$) of 0.90 or less, and
      a ratio of a D-band peak intensity to a G-band peak intensity in a Raman spectrum (ratio D/G) of 1.50 or more; and
   a catalyst metal supported by the carbon material.

2. The electrode catalyst for fuel cells according to claim 1, wherein the peak intensity ratio $I_A/I_G$ of the carbon material is 0.80 or less.

3. The electrode catalyst for fuel cells according to claim 1, wherein the catalyst metal comprises platinum or a platinum alloy.

4. The electrode catalyst for fuel cells according to claim 1, wherein the peak intensity ratio D/G of the carbon material is in the range of from 1.54 to 1.90.

5. The electrode catalyst for fuel cells according to claim 1, wherein the peak intensity ratio D/G of the carbon material is in the range of from 1.60 to 1.68.

6. The electrode catalyst for fuel cells according to claim 1, wherein a crystallite thickness Lc of the (002) plane of the carbon material is in the range of from 1.0 nm to 3.0 nm.

7. The electrode catalyst for fuel cells according to claim 1, wherein a crystal width La of the carbon material is in the range of from 1.8 nm to 3.2 nm.

8. The electrode catalyst for fuel cells according to claim 1, wherein the peak intensity ratio $I_A/I_G$ of the carbon material is in the range of from 0.47 to 0.90.

9. The electrode catalyst for fuel cells according to claim 1, wherein the peak intensity ratio $I_A/I_G$ of the carbon material is in the range of from 0.47 to 0.80.

10. The electrode catalyst for fuel cells according to claim 1, wherein the peak intensity ratio $I_A/I_G$ of the carbon material is in the range of from 0.47 to 0.70.

11. The electrode catalyst for fuel cells according to claim 1, wherein the peak intensity ratio $I_A/I_G$ of the carbon material is in the range of from 0.47 to 0.60.

12. The electrode catalyst for fuel cells according to claim 1, wherein the peak intensity ratio D/G of the carbon material is in the range of from 1.50 to 1.68.

13. The electrode catalyst for fuel cells according to claim 1, wherein the peak intensity ratio D/G of the carbon material is in the range of from 1.60 to 1.90.

14. The electrode catalyst for fuel cells according to claim 1, wherein the carbon material has a specific surface area of 400 m$^2$/g or more.

15. The electrode catalyst for fuel cells according to claim 1, wherein the carbon material has a specific surface area in the range of from 400 to 1400 m$^2$/g.

16. The electrode catalyst for fuel cells according to claim 1, wherein the carbon material has an average particle size in the range of from 0.05 μm to 10 μm.

17. A catalyst layer for fuel cells, comprising the electrode catalyst for fuel cells according to claim 1.

18. The catalyst layer for fuel cells according to claim 17 further comprising an ionomer.

19. A fuel cell comprising the electrode catalyst for fuel cells according to claim 1.

20. A fuel cell comprising the catalyst layer for fuel cells according to claim 17.

* * * * *